(12) United States Patent
Lakshminarayan et al.

(10) Patent No.: US 12,340,400 B2
(45) Date of Patent: *Jun. 24, 2025

(54) METHOD AND NON-TRANSITORY COMPUTER READABLE MEDIUM FOR MODELS BASED ON DATA AUGMENTED WITH CONCEIVABLE TRANSITIONS

(71) Applicant: Micro Focus LLC, Santa Clara, CA (US)

(72) Inventors: Choudur K. Lakshminarayan, Austin, TX (US); Ram Kosuru, Austin, TX (US)

(73) Assignee: Micro Focus LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,612

(22) Filed: Jun. 8, 2023

(65) Prior Publication Data

US 2023/0316352 A1    Oct. 5, 2023

Related U.S. Application Data

(62) Division of application No. 15/770,899, filed as application No. PCT/US2015/058109 on Oct. 29, 2015, now Pat. No. 11,720,940.

(51) Int. Cl.
*G06Q 30/0601*    (2023.01)
*G06N 20/00*    (2019.01)
*G06Q 30/06*    (2023.01)

(52) U.S. Cl.
CPC ......... *G06Q 30/0601* (2013.01); *G06N 20/00* (2019.01); *G06Q 30/06* (2013.01)

(58) Field of Classification Search
CPC ..... G06Q 30/0601; G06Q 30/06; G06N 20/00
See application file for complete search history.

(56) References Cited

U.S. PATENT DOCUMENTS

| 6,631,360 B1 | 10/2003 | Cook |
| 7,222,085 B2 | 5/2007 | Stack |
| 8,966,036 B1 | 2/2015 | Asgekar et al. |

(Continued)

FOREIGN PATENT DOCUMENTS

| CN | 103927347 | 7/2014 |
| WO | WO-2014124333 A1 | 8/2014 |

OTHER PUBLICATIONS

A. Abbasi, R. Y. K. Lau and D. E. Brown, "Predicting behavior," in IEEE Intelligent Systems, vol. 30, No. 3, pp. 35-43, May-Jun. 2015, doi: 10.1109/MIS.2015.19. (Year: 2015).*

(Continued)

*Primary Examiner* — Matthew E Zimmerman
*Assistant Examiner* — Latasha D Ramphal
(74) *Attorney, Agent, or Firm* — Sheridan Ross P.C.

(57) ABSTRACT

According to an example, a model is selected from models including an augmented buyer model based on probabilities of conceivable transitions, and each conceivable transition includes a multi-step transition between a first URL and a second URL via at least one intermediate URL of the website. A user is determined to likely be a buyer or a non-buyer based on interaction data and the selected model. The user is presented with an offer that encourages the user to buy from the website upon the determination that the user is a buyer.

19 Claims, 6 Drawing Sheets

(56) References Cited

U.S. PATENT DOCUMENTS

| | | |
|---|---|---|
| 2008/0052160 A1 | 2/2008 | Forlai |
| 2008/0250026 A1 | 10/2008 | Linden et al. |
| 2008/0270398 A1* | 10/2008 | Landau .............. G06Q 30/0601 |
| | | 705/26.1 |
| 2010/0114654 A1 | 5/2010 | Lukose et al. |
| 2011/0015982 A1 | 1/2011 | Singh et al. |
| 2012/0143861 A1* | 6/2012 | Sethi ................... G06F 16/2465 |
| | | 707/E17.014 |
| 2018/0053114 A1* | 2/2018 | Adjaoute ................ G06N 3/02 |

OTHER PUBLICATIONS

Emad Gohari Boroujerdi, et al. "A Study on Prediction of User's Tendency Toward Purchases in Online Websites Based on Behavior Models"; Oct. 10, 2013 Models;http://ceit.aut.ac.ir/~s.mehri/private/download/aisp2013_submission_112.pdf >.

International Searching Authority, "Notification Of Transmittal Of The International Search Report And The Written Opinion", PCT/US2015/058109, Jul. 25, 2016 13 pages.

Nick Dingwall; "Can Graph Databases Enable Whole New Classes of Event Analytics" Jul. 28, 2014; http://snowplowanalytics.com/blog/2014/07/28/explorations-in-analyzing-web-event-data-in-graph-databases/ >.

Wolfgang Gaul; Title:Web Mining and Its Interrelations to Classification Data Mining and Market Research; Date Unknown; http://www.classification-society.org/meetings/ifcs04/abstracts/node2.html >.

\* cited by examiner

| Session Name | Page Name | Key Purchase Indicator (KPI) 302 |
|---|---|---|
| 320611406779612746869641750-4 | us:welcome-home | 0 |
| 320611406779612746869641750-4 | us:sale:static:springsale | 0 |
| 320611406779612746869641750-4 | us:en-us:laptops notebook pc | 0 |
| 120611406779612746869641750-4 | us:laptops pavilion 15t-n200 notebook pc with windows 7 | 1 |

FIG. 3

METHOD AND NON-TRANSITORY
COMPUTER READABLE MEDIUM FOR
MODELS BASED ON DATA AUGMENTED
WITH CONCEIVABLE TRANSITIONS

CROSS REFERENCE TO RELATED
APPLICATION

The present application is a continuation of application of U.S. application Ser. No. 15/770,899, filed Apr. 25, 2018, which is a 371 of international PCT/US2015/058109, filed Oct. 29, 2015, entitled "MODELS BASED ON DATA AUGMENTED WITH CONCEIVABLE TRANSITIONS", both of which are incorporated herein by this reference in their entirety.

BACKGROUND

The rise of the Internet lead to the development of ecommerce wherein goods and services are sold online by various vendors via their websites. The online retailers observe users' buying habits in order to present various offers that attract business. The advent of new data sources ranging from large websites or cloud-based applications to small user devices including smartphones and wearables has made the online businesses accessible by the users from anywhere and at any time. As a result, large volumes of complex data in various formats are generated that relate to online businesses.

BRIEF DESCRIPTION OF THE DRAWINGS

Features of the present disclosure are illustrated by way of example and not limited in the following figure(s), in which like numerals indicate like elements, and in which:

FIG. 3 shows the information regarding a user's browsing session that is used for generating the models, according to an example of the present disclosure;

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. In the present disclosure, the term "includes" means includes but not limited thereto, the term "including" means including but not limited thereto. The term "based on" means based at least in part on. In addition, the terms "a" and "an" are intended to denote at least one of a particular element.

Examples of the present application estimate probabilities for multi-step conceivable transitions which may be modeled as Markov chains of higher orders, such as second order or greater. The modeling for example enables a more accurate identification of user intent. Human intent may be estimated from online actions in order to improve services and increase revenues, user satisfaction and other key performance indices (KPIs). Clickstreams are modeled to predict behaviors of users browsing a website, and the intent of the user to buy or not to buy ("no buy") from an ecommerce website can be estimated from modeled clickstreams. A clickstream may include a sequence of clicks in a session. Examples of the present application gather clicks and user navigation actions from a first URL (Universal Resource Locator) to a second URL or multiple other URLs and determines a model of conceivable transitions between URLs which may be modeled as Markov chains of higher orders. For example, the model of conceivable transitions includes conceivable transitions of multiple steps from one URL to another URL via one or multiple intermediate URLs. The model for example is a higher order Markov chain, such as higher than a first order Markov chain which may be limited to single transitions with no intermediate transitions.

Figure 1:
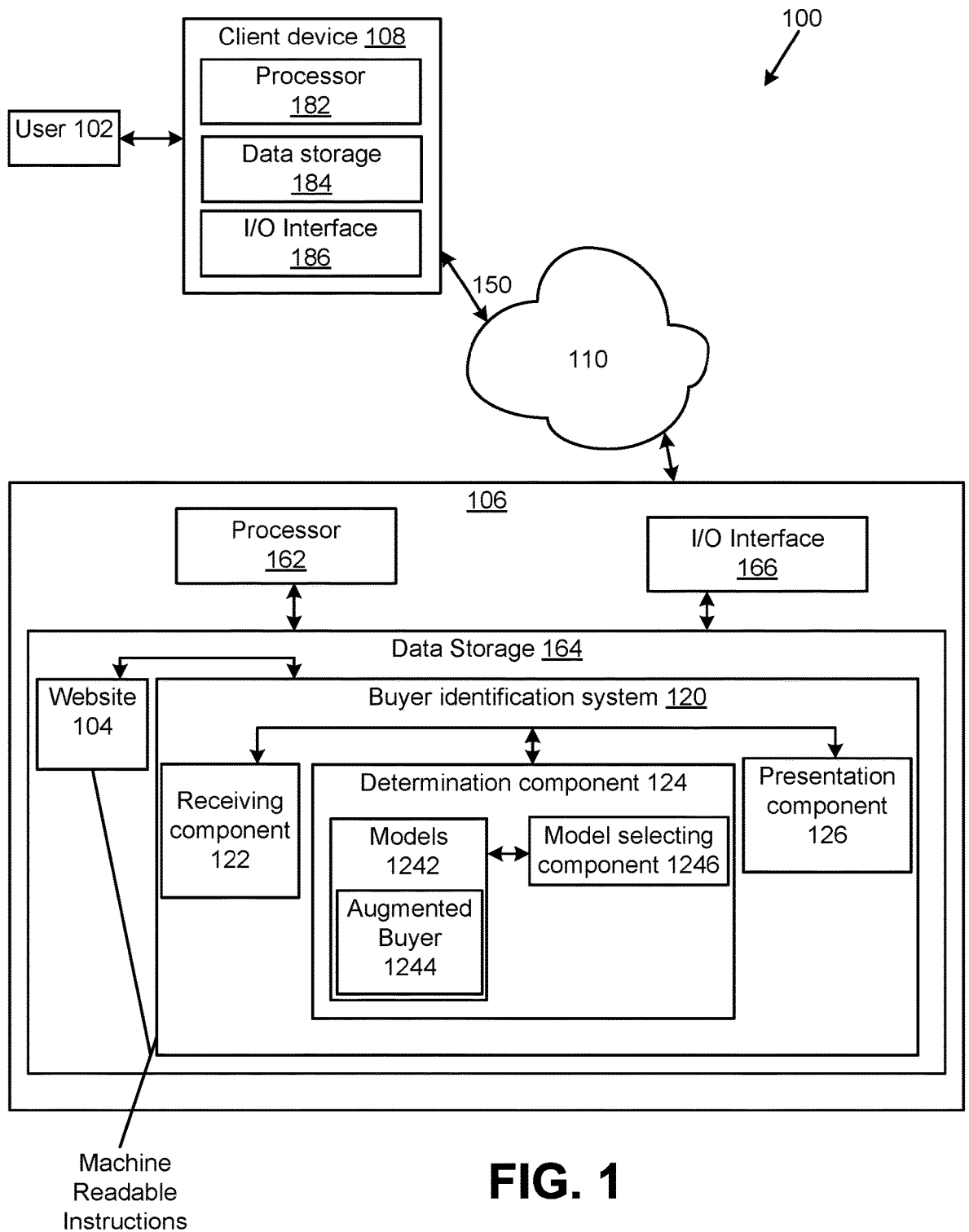
FIG. 1 is a schematic diagram of a system wherein a user accesses a website, according to an example of the present disclosure.

FIG. 1 is a schematic diagram of a system 100 wherein a user 102 accesses a website 104 via a webserver 106 for browsing and/or purchasing purposes. A client device 108 can be employed by the user 102 for accessing the website 104 via a network 110 such as the Internet. The client device 108 can be a smartphone, a laptop, a desktop, a wearable device or other apparatus that is configured for communication with the webserver 106. In one example, the website 104 can be an ecommerce website that sells goods and/or services. The webserver 106 can comprise a buyer identification system 120 that is configured to identify during a user's browsing session, if the user 102 is likely to be a buyer who plans to make a purchase or a non-buyer who is just browsing. If the buyer identification system 120 identifies that the user 102 is likely to be a buyer, then further actions to encourage the user's 102 decision to buy from the website 104 can be executed by the web server 106. By the way of non-limiting examples, the user's 102 buying decision can be encouraged via providing a coupon, upgrades, cross-selling and the like. Conversely, if the buyer identification system 120 identifies the user 102 as a likely non-buyer, the user's 102 behavior can be continuously monitored by the buyer identification system 120 during the user's 102 browsing session to determine if there is any change that indicates that the user 102 is a buyer.

The client device 108 comprises a processor 182, a non-transitory processor readable data storage medium 184 and an I/O interface 186 that enables it to communicate with the webserver 106. Similarly, the webserver 106 can be a computing apparatus comprising a processor 162, an I/O (Input/Output) interface 166 and a non-transitory processor readable data storage medium 164. The processors 162, 182 may each include at least one microprocessor operable to execute machine readable instructions to perform programmed operations. The data storage media 164, 184 may include volatile and/or non-volatile data storage, such as random access memory, memristors, flash memory, and the like. In an example, the data storage medium 164 can also comprise the buyer identification system 120.

The buyer identification system 120 comprises a receiving component 122 that receives interaction data 150 which comprises, for example, the user's click through data. Click through data may include an element of a web page that is clicked on and a web page that the user is directed to in response to the click. The click through data for example identifies the current web page that includes the element that was clicked on, and the web page that the user is directed to in response to the click. The user's interaction data 150 is analyzed by a determination component 124 based on a plurality of models 1242 each of which can estimate the user's 102 likelihood of making a purchase or the likelihood that the user 102 is a buyer. In an example, the models 1242 can comprise models for buyers and non-buyers based on historical interaction data associated with prior users who visited the website 104.

The models 1242 can thus calculate probabilities for the user 102 as a likely buyer and a likely non-buyer based on the historical interaction data which can comprise data regarding actual transitions that occurred during prior users' browsing sessions. The browsing sessions from prior users may include a buy event in which case, the prior user is classified as a buyer. However, a large number of prior users' sessions may not have included the buy event and largely comprise merely browsing sessions wherein no purchase has occurred. Generally, the number of sessions resulting or including a buy event are far fewer (<5%) when compared to the "no-buy" sessions. For example, in a data set of 100,000 sessions with over 1 million transitions (each transition being an edge from one node to another), 2000 sessions may include a buy event.

In order to enhance the capability of the models 1242 to predict a buy event, data regarding conceivable transitions that could have occurred from a first URL to a second URL in multiple steps via intermediate URLs can also be generated from the historical data. The models 1242 can therefore comprise an augmented buyer model 1244 in addition to other models corresponding to buyers and non-buyers. The augmented buyer model 1244 employs Markov chains of higher orders such as 2, 3, 4 . . . etc. for making a prediction regarding the user 102. The probabilities including the probabilities for conceivable transitions is compared to a significance threshold measure to determine if they are significant. If the probabilities for the conceivable transitions are significant compared to the threshold measure, then the probabilities for conceivable transitions can be used to make a prediction regarding the user 102 being a buyer or a non-buyer. If the probabilities from the conceivable transitions are not significant as compared to the threshold measure, then the actual transition data can be used to make a prediction regarding the user 102 being a buyer or a non-buyer. Thus, the conceivable transitions enhance the accuracy of detecting the user's 102 buying intent.

In one example, a model selecting component 1246 enables selecting one of the models 1242 based on the interaction data 150. The determination regarding the user 102 being a buyer or a non-buyer can be predicted by the selected model. If the interaction data 150 indicates that the user's 102 browsing pattern fits a buyer model, the model selecting component 1246 compares the probabilities associated with the augmented buyer model 1244 based on conceivable transitions to a predetermined significance threshold measure. If the probability $P_{ij}$ for any edge (i, j) exceeds the significance threshold measure, then the augmented buyer model 1244 which includes probabilities for the conceivable transitions can be used by the buyer identification system 120 to predict the user's 102 intent to buy.

If the probabilities $P_{ij}$ for any edge (i, j) does not exceed the significance threshold measure, then an alternate buyer model based on the actual transitions and which does not include the conceivable transitions can be used to predict the user's 102 intent to buy. In one example, if min and max are the variables to store the minimum and maximum probabilities for a buyer graph $G_2$ without augmentation and $P_{ij}$ is the augmented probability for the edge (i, j) of graph $G_2$, then $P_{ij}$ is used in the prediction if:

$$P_{ij} \geq \frac{(\max + \min)}{2} \qquad \text{Eq. 1}$$

Using conceivable transitions, the buyer identification module 120 can more accurately predict the buying intent of users visiting the website 104. It can be appreciated that Eq. 1 shows one example for determining the level of significance the probabilities of the edges without augmentation should meet in order to be used for the predictions. In one example, $P_{ij}$ can be used if it is greater than the mode of probabilities in the graph $G_2$.

$$P_{ij} \geq \text{mode} \qquad \text{Eq. 2}$$

In one example, $P_{ij}$ can be used if:

$$P_{ij} \geq (\text{mode}+\min)/2. \qquad \text{Eq. 3}$$

Thus, the significance threshold for determining whether or not to use $P_{ij}$ in the prediction can be a tunable parameter depending on the applications. Other calculations of the significance threshold can be used by the model selecting component 1246 in selecting a model to make the prediction.

If it is determined by the determination component 124 that the user 102 is a buyer, then further actions to encourage the user's 102 decision to buy from the website 104 can be executed by the presentation component 126. By the way of non-limiting examples, the user's 102 buying decision can be encouraged via presenting one or more of a coupon, upgrades, cross-selling and the like by the presentation component 126. As a buying session is commonly much rarer than a browsing session which includes no purchase, the training data set available for the buyer class is much smaller than the training data set available for the non-buyer class. The buyer identification system 120 enables augmenting the training data set for the buyers to improve the classification of unknown data. Imputing connections among links between the URLs and estimating transition probabilities or edge weights based the conceivable transitions arising from the imputed connections can be beneficial for delineating the user intent more accurately. It can be appreciated that the buyer identification system 102 is shown as being included on the webserver 106 only for illustration. In one example, the buyer identification system 120 can be executed on a computing apparatus that is remote from the webserver 106 and connected to the webserver 106 via the network 110 for user monitoring. In one example, the user's 102 ultimate action regarding a purchase or absence of a purchase can be fed back to a system that generates and updates the models 1242 for further training as is discussed below.

Figure 2:
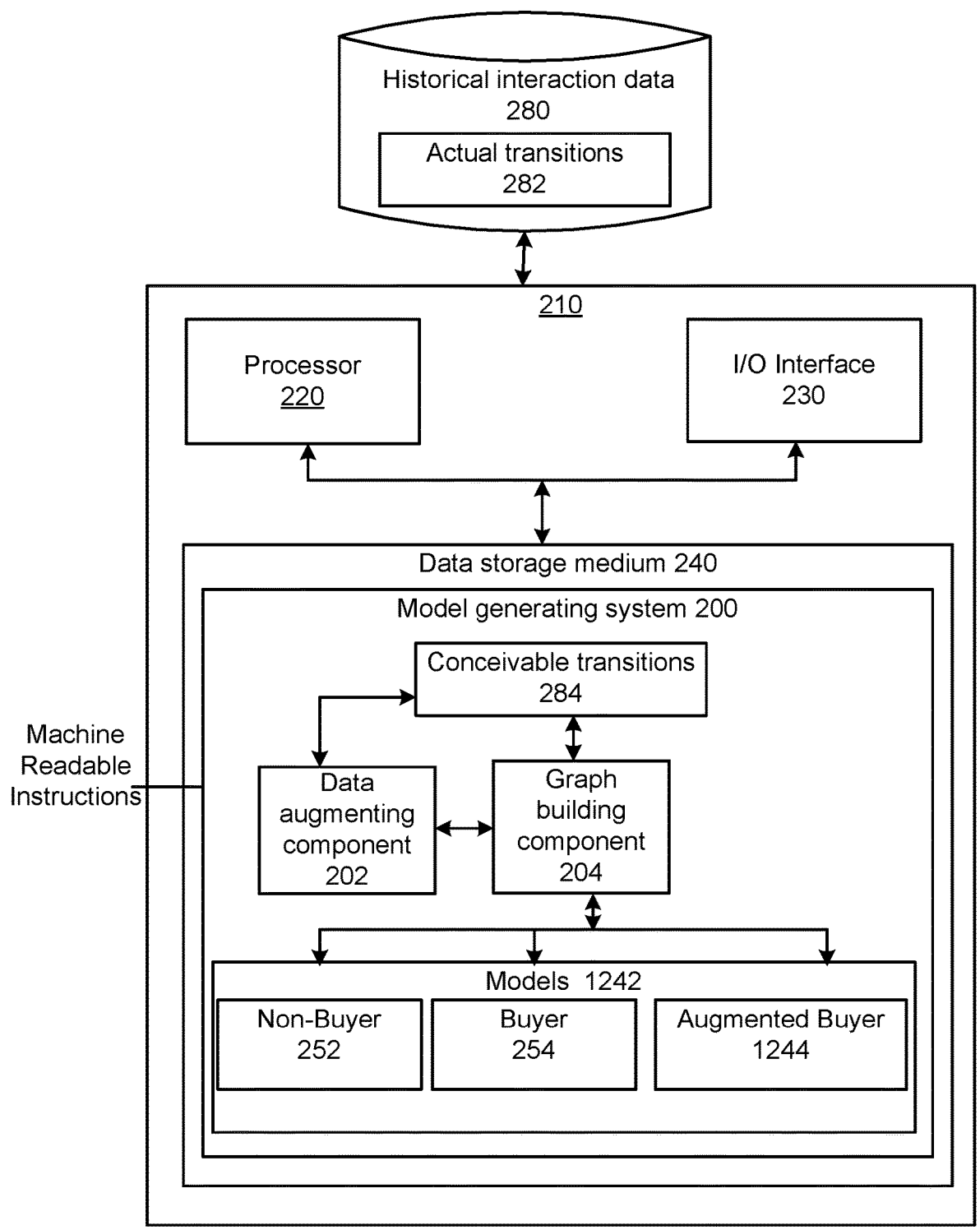
FIG. 2 illustrates a schematic diagram of a model generating system that generates models for non-buyers and buyers, according to an example of the present disclosure.

FIG. 2 is a schematic diagram of a model generating system 200 that generates models 252 for non-buyers and models 254 and 1244 for buyers in one example. In one example, the model generating system 200 can be executed by a computing apparatus 210 comprising a processor 220, an I/O interface 230 that enables it to communicate with the webserver 106 and other networked devices. In one example, the computing apparatus 210 can be remotely located from the webserver 106. A non-transitory processor readable data storage medium 240 of the computing apparatus 210 stores the model generating system 200 as machine readable instructions for execution by the processor 220. In one example, the model generating system 200 accesses historical interaction data 280 collected from the interactions of the website 104 visitors to build models for buyers and non-buyers. The models 1242 can be accessed by the webserver 106 which employs them for making predictions regarding the users/visitors browsing through the website 104. The historical interaction data 280 can be stored in a local storage of the computing apparatus 210 or it can be stored in a remote storage including a cloud storage and accessible to the computing apparatus 210 via a communication network.

In one example, the historical interaction data 280 comprises the actual transition data 182 of the prior users. When a prior user moves from a first URL (Universal Resource Locator) to a second URL in a single step or multiple steps, then such transitions are recorded in the historical interaction data 280. The historical interaction data 280 also enables generating data for conceivable transitions 184 that could have occurred but may not occur in reality and hence are not recorded in the historical interaction data 280. For example, the user's transition from a first URL to a second URL can also occur in multiple steps. The user could have transitioned from the first URL to one or more intermediate URLs within the website 104 prior to reaching the second URL. The historical interaction data 280 enables determining probabilities for multi-step transitions that could conceivably have occurred during a user session.

In one example, the sequence of clicks within a session generated by a prior user to the website 104 can be modeled as a connected graph wherein the nodes visited by the prior user are the URLs and the edges between the nodes are the probability of transitions between the nodes. Based on the link structure, the data augmenting component 202 generates connections which are absent in the actual transitions 282 which comprise navigation patterns of prior buyers and non-buyers who visited the website 104. For example, connections between pages i→k and k→j may exist in the data for actual transitions 182, but the connection between i→j may be absent. By exploiting the one-level transitions from i to k and k to j, the second level connection between i→j can be established as conceivable transitions 284 by the data augmenting component 202 via marginalizing over all k∈S where S is the set of all URLs (k) in the intermediate layer to obtain $P_{ij}$. The data augmenting component 202 can identify a plurality of such multiple-step paths from i→j via many intermediate URLs such as, i→k→l→j where k and l are the URLs or pages in the intermediate layers.

The graph building component 204 can access the data of the actual transitions 282 to build graphs from the historical interaction data 280. Separate graphs 252, 254 and 1244 can be generated by the graph building component 204 for browsing sessions that do not include a buy event and those having a buy event. The URLs in the website 104 can be modeled as the nodes of the graph. The nodes are connected by edges indicative of the transition probabilities between the nodes. Missing transition probabilities in the actual transitions 182 can be obtained by considering graphs $G_i$ where i=1, 2, . . . k, where i indexes the depth of the graph. For example, the actual transitions 182 can include connections i→k→l and i→j but not i→k→l→j. By linking i→k→l and l→j and marginalizing over pages k→l, $P_{ij}$ can be obtained. Using the clickstream data from the historical transition data 280, various graphs $G_i$ for i=1 2, 3 . . . are generated by the graph building component 204 for sessions having a buy event and the sessions that did not include a buy event. For i=1, the edge weight for one level transitions is given by P(j|i) (probability of j given i). For i=1, the edge weight for two level transitions is given by P(j|k,i) (probability of j given k and i). Similarly, the edge weights for higher level transitions wherein i=3, 4 . . . can also be computed from the historical transition data 180.

In particular, a graph $G_1$ can be composed for sessions with buy events wherein the pages are nodes of the graph and an edge (i, j) is calculated if there is a transition from node i to node j. Each edge (i, j) of the graph $G_1$ contains a probability $P_{ij}$ which is computed from the frequencies calculated from user paths (navigations) from the actual transition data 282. Or a weight is associated with each edge that indicates how many times the edge appeared in the actual transition data 282. The probability $P_{ij}$ of an edge can be calculated via normalizing the weight across all edges originating at that node. Higher order graphs to model higher order Markov chains are also built by the graph building component 204. For example, a second order graph $G_2$ can be built with an edge (i, j) if there is a connection from node i to node j through an intermediate node k. A third order graph $G_3$ can also be built with an edge (i, j) if there is a transition from the node i to the node j through two intermediate nodes k and l. Similarly, graphs $nG_i$ of various orders for i=1, 2, 3, 4 . . . can also be built for "no buy" sessions where the users merely browse the website 104 without making any purchases. The Markov chain of order 1, $MC_1$ is represented by graphs $G_1$ and $nG_1$ respectively for buy and no-buy sessions. Similarly, the Markov chain of order $MC_2$ is represented by the graphs $G_2$ and $nG_2$.

Consider a sequence of pages $U_1$, $U_2$, $U_3$, . . . $U_{k-1}$, $U_k$ traversed by the user 102. The joint probability of the sequence can be computed from the graphs $G_1$ and $nG_1$ using the formula:

$$P(U_1 U_2 U_3 \ldots U_{k-1} U_k \ldots) = P(U_k|U_{k-1}) \ldots P(U_3|U_2)P(U_2|U_1)P(U_1) \quad \text{Eq. (4)}$$

where P(Uj|Ui) is $P_{ij}$ taken from $G_1$ or $nG_1$ depending on the Markov chain used. In order to build a graph based on data of the augmented transitions 284, the graph building component 204 initially builds a graph $G_2$ as described above via the computation of transition probabilities. Paths of length two that exist between each of the two nodes in the graph are identified and the graph $G_2$ is augmented with an edge between the two nodes. The weight is augmented as a summation of weights of the two edges that constitute the path of length 2. In one example, the augmented weights are stored as a separate matrix while the original weights remain intact. Thus, two sets of probabilities corresponding to the buyer model 254 and the augmented buyer model 1244 are computed by the graph building component 204—one from the actual transitions 282 and another from the augmented transitions 284.

FIG. 3 shows one example 300 of information regarding a user's browsing session that can be obtained from the interaction data 150. During the session, the user visits many pages. The KPI (class) column 302 contains a binary value of 1 or 0 wherein 1 is indicative the user making a purchase and 0 indicating that the user has not made a purchase at the end of the session. As seen from the KPI column, the buy event occurs infrequently while the browsing sessions without the buy event occur with higher frequency. Logs of user visits comprising data regarding millions of user browsing sessions can be analyzed in accordance with the methodologies described herein to accurately discern a website visitor's buying intent.

Figure 4:
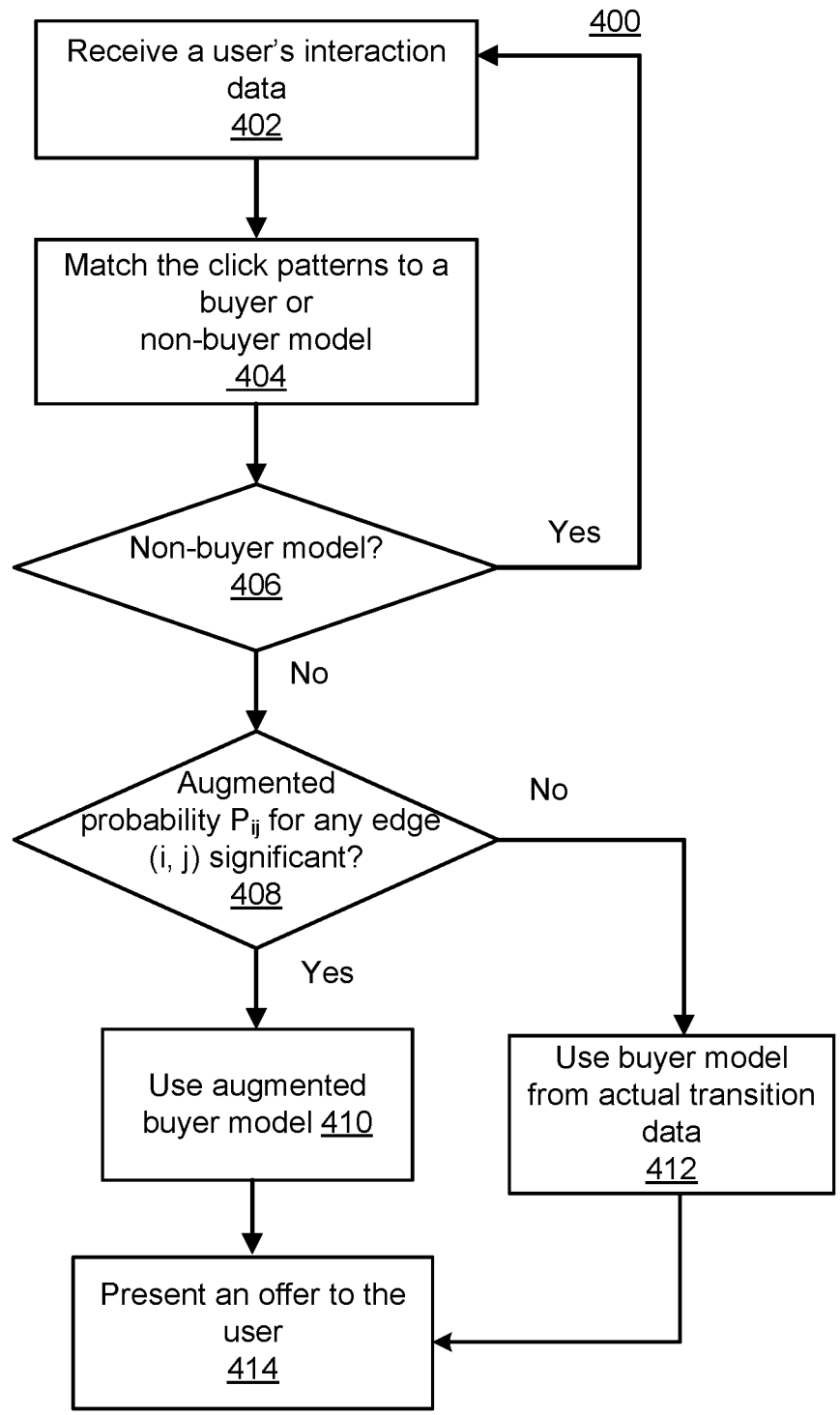
FIG. 4 is a flowchart that details a method of determining if a user is a buyer or a non-buyer, according to an example of the present disclosure.

FIG. 4 is a flowchart 400 that details one example method of determining if a user is a buyer or a non-buyer. The method begins at 402 wherein the user's 102 interaction data 150 is received. In one example, the user's 102 selection of webpages from the website 104 can be received at 402. At 404, the user's 102 click through pattern is matched to a model of the models 1242. At 406, it is determined if the matched model is a non-buyer model 252. If at 406, it is determined that the user's 102 click through pattern corresponds to the non-buyer model 252, the process returns to 402 to continue receiving the user's interaction data 150 in order to detect any change in the user's 102 no-buy sentiment. If it is determined at 406 that the interaction data 150 corresponds to that of a buyer's model, it can be further determined at 408 if the probability $P_{ij}$ of any edge (i, j) is significant based on a predetermined measure. For example, the significance of $P_{ij}$ can be measure via one of the equations (1), (2) or (3). If yes, then the augmented buyer model 1244 is selected at 410 for the user 102. If it is determined at 408 that the probability $P_{ij}$ of any edge (i, j) is not significant, the buyer model 254 based on the actual transitions 282 is selected at 412. In either case, an offer is presented at 414 to encourage the user 102 to make a purchase.

Figure 5:
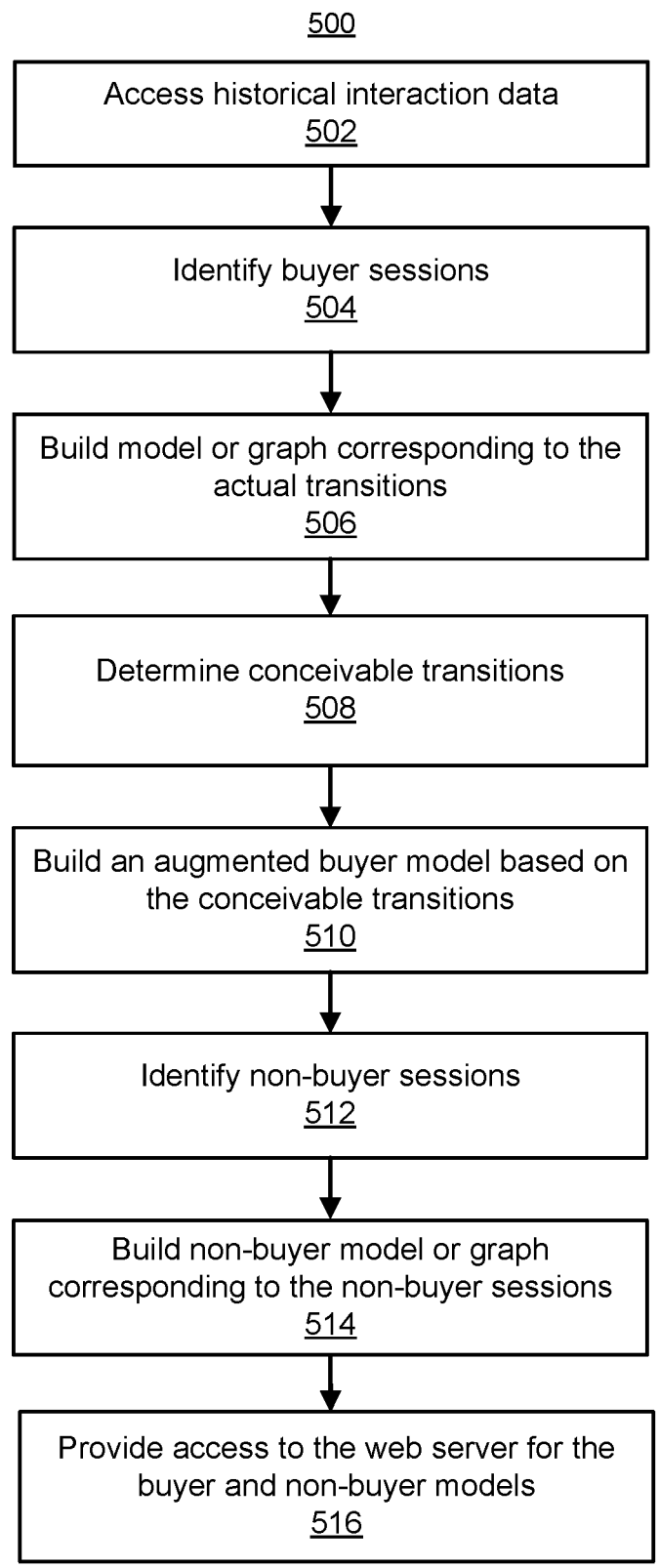
FIG. 5 shows a flowchart that details a method of building buyer and non-buyer graphs, according to an example of the present disclosure.

FIG. 5 is a flowchart 500 that details one example of a method to build the buyer and non-buyer models 252, 254 and 1244. The method begins at 502 wherein the historical interaction data 280 of users of the website 104 is accessed. The historical interaction data 280 can comprise logs of user visits that includes click through data of the users in one example. At 504, the buyer sessions where a buy event occurred are identified from the historic interaction data 280. A graph or a buyer model 254 is built for the buyer sessions at 506 using the data corresponding to the actual transitions 282 from the historical interaction data 280. At 508, the conceivable transitions 284 that could have occurred based on the single-step or multi-step transitions in the buyer sessions of the historical interaction data 280 are determined. At 510, an augmented graph or an augmented buyer model 1244 can also be built with the URLs traversed by the buyers as nodes. The edges connecting the nodes include the transitional probabilities of not only the actual transitions that occurred in the buyer sessions but also the conceivable transitions 284 that were generated from the actual transitions 282. At 512, the browsing-only sessions where a buy event did not occur are identified from the historical interaction data 280. At 514, a non-buyer 252 model is generated from the actual transitions in the historical interaction data 280 of the sessions that did not include a buy event. As the data available for non-buyer sessions is far greater than the buyer sessions, no further augmentation is required for the non-buyer graphs. The models 1242 are made available or accessible to the webserver 106 at 516 so that website visitors can be accurately classified and appropriate actions can be executed.

Figure 6:
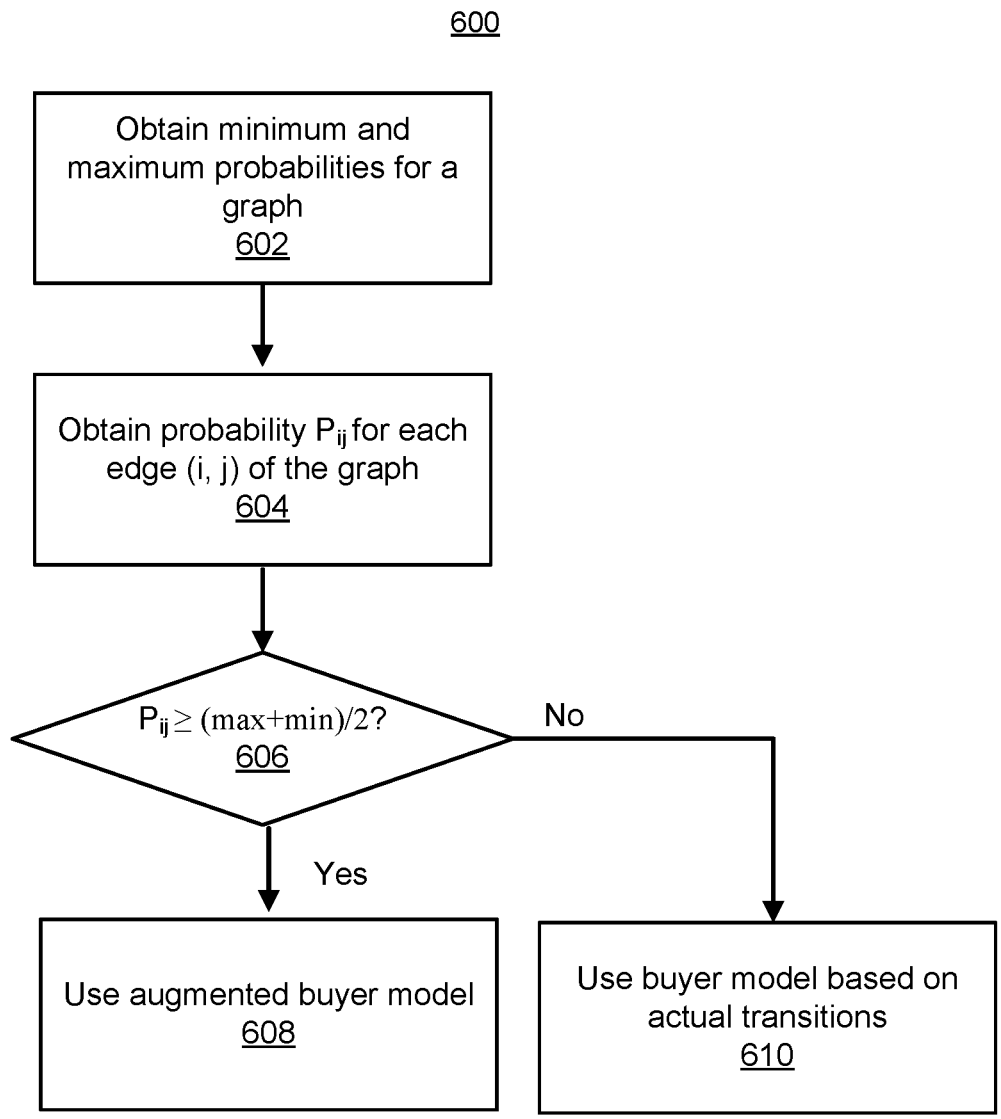
FIG. 6 is a flowchart that details a method of determining if probabilities from conceived transitions are significant, according to an example of the present disclosure.

FIG. 6 is a flowchart 600 detailing one example of a methodology for determining if the probabilities from the conceived transitions 284 are significant so that the augmented buyer model 1244 can be used to predict the user's 102 intent. At 602, the minimum and maximum probabilities from a given graph, for example, $G_2$ without augmentation are obtained. In one example, the metric used to determine the significance combines the minimum and maximum probabilities over all the edges. At 604 the augmented probability $P_{ij}$ for each of the edges (i, j) for $G_2$ is obtained. At 606, it is determined if $P_{ij}$ is greater than or equal to (max+min)/2. If yes, the augmented buyer model 1244 is employed at 608 in making a prediction regarding the user 102. If at 606, it is determined that for any edge (i, j), the probability $P_{ij}$ is less than (max+min)/2, then the buyer model 254 based on the actual transitions 282 is used at 610 to make the prediction regarding the user 102. Again, it can be appreciated that other methods of determining if the probabilities of conceivable transitions are significant based on, for example, the mode as given in the Eq. 2 and Eq. 3 are also possible.

In general, augmenting data of the actual transitions 282 with conceivable transitions 284 that could occur, by edge-weight imputation delivers superior performance with respect to discerning the users' buying intention. More particularly, the false positives were reduced, the specificity rates go up and recall is also higher. In fact, the use of conceivable transitions via the augmentation of edges of a graph can be applicable to not only differentiating buyers from non-buyers but also to other binary decisions where one of the two choices occurs with low-frequency.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims, and their equivalents, in which all terms are meant in their broadest reasonable sense unless otherwise indicated.

What is claimed is:

1. A method, comprising:
augmenting, by a processor, historical interaction data of prior buyers and non-buyers that browsed a website by imputing connections among links between universal resource locators (URLs) of the website and estimating an augmented set of transition probabilities based on conceivable transitions arising from the imputed connections, each of the conceivable transitions including a multi-step transition between a first URL and a second URL via at least one intermediate URL of the website;
training, by the processor, each of a plurality of different models using the historical interaction data and/or augmented historical interaction data;
receiving, by the processor from a client device, interaction data of a user browsing the website;
providing, by the processor, a plurality of different models for an intent of the user based on the interaction data, the plurality of different models comprising at least one augmented buyer model based on the augmented set of transition probabilities of the conceivable transitions and an alternate buyer model based on an actual transition between the first URL and the second URL;
comparing, by the processor, a transition probability of the augmented set of transition probabilities associated with the augmented buyer model based on a conceivable transition to a significance threshold measure;
applying, by the processor, the following rules:
when the transition probability of the augmented set of transition probabilities exceeds the significance threshold measure, selecting the augmented buyer model; and when the transition probability of the augmented set of transition probabilities does not exceed the significance threshold measure, selecting the alternate buyer model;

determining, by the processor, when the user is likely to be a buyer, based on the interaction data and the selected one of the augmented buyer model and the alternate buyer model; and presenting, by the processor, the user with an offer to buy from the website upon the determination that the user is likely to be the buyer.

2. The method of claim 1, wherein the augmented set of transition probabilities are modeled as a Markov chain of higher than a first order and further comprising by the processor:

determining whether the interaction data matches a buyer or nonbuyer model;

when the interaction data matches the nonbuyer model, repeating iteratively and as the user browses the website, the receiving of interaction data and determining whether the interaction data matches the buyer or the nonbuyer model; and when the interaction data matches the buyer model, performing the comparing of the transition probability associated with the augmented buyer model and determining when the user is likely to be the buyer or a non-buyer.

3. The method of claim 1, wherein the alternate buyer model is without augmentation, wherein each conceivable transition is a transition that could have occurred based on transitions from the first URL to the at least one intermediate URL and from the at least one intermediate URL to the second URL recorded in the historical interaction data, wherein, in the augmented historical interaction data, the processor models a sequence of clicks in the historical interaction data as a connected graph in which each of a plurality of nodes visited by a prior user to the website represents a URL and an edge between a selected pair of nodes are associated with a transition probability of a transition between the selected pair of nodes, and wherein in the comparing of the transition probability associated with the augmented buyer model based on a conceivable transition to the significance threshold measure comprises the processor determining whether a transition probability for any edge in the connected graph exceeds the significance threshold measure, selecting the augmented buyer model when the transition probability for one or more edges in the connected graph exceeds the significance threshold measure, and selecting the alternate buyer model when the transition probability for any edge in the connected graph does not exceed the significance threshold measure.

4. The method of claim 1, wherein the alternate buyer model does not include any conceivable transition, wherein the processor augments the historical interaction data by building a second order or higher Markov chain, and wherein to determine if the user is likely to be the buyer further comprising by the processor:

recording transitions of the user between the URLs of the website as the interaction data; and constructing a transition matrix for the user based on the recorded transitions of the user.

5. The method of claim 4, further comprising by the processor:

comparing a transition probability in the transition matrix of the user with transition probabilities of the augmented set of transition probabilities from prior buyers and prior non-buyers.

6. The method of claim 5, wherein to train each of the plurality of different models using the historical interaction data and/or the augmented historical interaction data further comprising by the processor:

training the augmented buyer model using the augmented historical interaction data; and training the alternate buyer model using the historical interaction data; and selecting one of the plurality of different models comprises selecting one of the alternate buyer model, the augmented buyer model, and a non-buyer model.

7. The method of claim 6, wherein, in the comparing of the transition probability associated with the augmented buyer model based on the conceivable transition to the significance threshold measure, the augmented set of transition probabilities comprises transition probabilities associated with each edge connecting nodes in a graph including the conceivable transitions and wherein the processor compares a transition probability of each edge with the significance threshold measure.

8. The method of claim 6, further comprising by the processor:

determining minimum and maximum transition probabilities from a selected graph without augmentation; and deriving the significance threshold measure from the minimum and the maximum transition probabilities.

9. The method of claim 1, wherein the determination regarding the user likely being the buyer is based on the comparison of a transition probability associated with the augmented buyer model based on the conceivable transition to the significance threshold measure.

10. The method of claim 1, further comprising:

receiving the historical interaction data of users of the website, the historical interaction data comprising one or more historical actual transitions between the first URL and the second URL;

building the alternate buyer model corresponding to the one or more historical actual transitions, the alternate buyer model having a first set of transition probabilities different from the augmented set of transition probabilities;

determining, based on the one or more historical actual transitions, one or more conceivable transitions between the first URL and the second URL; and building the augmented buyer model based on the historical actual transition and the one or more conceivable transitions such that edges connecting nodes corresponding to the first URL and the second URL include the transition probabilities of the first set of transition probabilities and the augmented set of transition probabilities.

11. A non-transitory computer readable medium comprising instructions that, when executed by a processor, cause the processor to:

augment historical interaction data of prior buyers and non-buyers that browsed a website by imputing connections among links between universal resource locators (URLs) of the website and estimating an augmented set of transition probabilities based on conceivable transitions arising from the imputed connections, each of the conceivable transitions including a multi-step transition between a first URL and a second URL via at least one intermediate URL of the website;

train each of a plurality of different models using the historical interaction data and/or augmented historical interaction data;

receive, from a client device, interaction data of a user browsing the website;
provide a plurality of different models for an intent of the user based on the interaction data, the plurality of different models comprising at least one augmented buyer model based on the augmented set of transition probabilities of the conceivable transitions and an alternate buyer model based on an actual transition between the first URL and the second URL;
compare a transition probability of the augmented set of transition probabilities associated with the augmented buyer model based on a conceivable transition to a significance threshold measure;
apply the following rules:
when the transition probability of the augmented set of transition probabilities exceeds the significance threshold measure, select the augmented buyer model; and
when the transition probability of the augmented set of transition probabilities does not exceed the significance threshold measure, select the alternate buyer model;
determine when the user is likely to be a buyer, based on the interaction data and the selected one of the augmented buyer model and the alternate buyer model; and
present the user with an offer to buy from the website upon the determination that the user is likely to be the buyer.

12. The non-transitory computer readable medium of claim 11, wherein the augmented set of transition probabilities are modeled as a Markov chain of higher than a first order and the processor further:
determines whether the interaction data matches a buyer or nonbuyer model;
when the interaction data matches the nonbuyer model, repeats iteratively and as the user browses the website, the receiving of interaction data and determining whether the interaction data matches the buyer or the nonbuyer model; and
when the interaction data matches the buyer model, performs the comparing of the transition probability associated with the augmented buyer model and determining when the user is likely to be the buyer or a non-buyer.

13. The non-transitory computer readable medium of claim 11, wherein the alternate buyer model is without augmentation, wherein each conceivable transition is a transition that could have occurred based on transitions from the first URL to the at least one intermediate URL and from the at least one intermediate URL to the second URL recorded in the historical interaction data, wherein, in the augmented historical interaction data, the processor models a sequence of clicks in the historical interaction data as a connected graph in which each of a plurality of nodes visited by a prior user to the website represents a URL and an edge between a selected pair of nodes are associated with a transition probability of a transition between the selected pair of nodes, and wherein in the comparing of the transition probability associated with the augmented buyer model based on a conceivable transition to the significance threshold measure comprises the processor determining whether a transition probability for any edge in the connected graph exceeds the significance threshold measure, selecting the augmented buyer model when the transition probability for one or more edges in the connected graph exceeds the significance threshold measure, and selecting the alternate buyer model when the transition probability for any edge in the connected graph does not exceed the significance threshold measure.

14. The non-transitory computer readable medium of claim 11, wherein the alternate buyer model does not include any conceivable transition, wherein the processor augments the historical interaction data by building a second order or higher Markov chain, and wherein to determine if the user is likely to be the buyer the processor further:
records transitions of the user between the URLs of the website as the interaction data; and
constructs a transition matrix for the user based on the recorded transitions of the user.

15. The non-transitory computer readable medium of claim 14, wherein the processor further:
compares a transition probability in the transition matrix of the user with transition probabilities of the augmented set of transition probabilities from prior buyers and prior non-buyers.

16. The non-transitory computer readable medium of claim 15, wherein to train each of the plurality of different models using the historical interaction data and/or the augmented historical interaction data the processor further:
trains the augmented buyer model using the augmented historical interaction data; and
trains the alternate buyer model using the historical interaction data; and
selects one of the plurality of different models comprises selecting one of the alternate buyer model, the augmented buyer model, and a non-buyer model.

17. The non-transitory computer readable medium of claim 16, wherein, in the comparing of the transition probability associated with the augmented buyer model based on the conceivable transition to the significance threshold measure, the augmented set of transition probabilities comprises transition probabilities associated with each edge connecting nodes in a graph including the conceivable transitions and wherein the processor compares a transition probability of each edge with the significance threshold measure.

18. The non-transitory computer readable medium of claim 11, wherein the determination regarding the user likely being the buyer is based on the comparison of a transition probability associated with the augmented buyer model based on the conceivable transition to the significance threshold measure.

19. The non-transitory computer readable medium of claim 11, wherein the processor further:
receives the historical interaction data of users of the website, the historical interaction data comprising one or more historical actual transitions between the first URL and the second URL;
builds the alternate buyer model corresponding to the one or more historical actual transitions, the alternate buyer model having a first set of transition probabilities different from the augmented set of transition probabilities;
determines, based on the one or more historical actual transitions, one or more conceivable transitions between the first URL and the second URL; and
builds the augmented buyer model based on the historical actual transition and the one or more conceivable transitions such that edges connecting nodes corresponding to the first URL and the second URL include the transition probabilities of the first set of transition probabilities and the augmented set of transition probabilities.

* * * * *